July 26, 1938. F. C. FRANK 2,124,773
WHEEL
Filed Nov. 19, 1934 2 Sheets-Sheet 1

INVENTOR.
FREDERICK C. FRANK
BY Jerome R. Cox
ATTORNEY

July 26, 1938.　　　F. C. FRANK　　　2,124,773
WHEEL
Filed Nov. 19, 1934　　　2 Sheets-Sheet 2

INVENTOR
FREDERICK C. FRANK
BY
Jerome R. Cox
ATTORNEY

Patented July 26, 1938

2,124,773

UNITED STATES PATENT OFFICE 2,124,773

WHEEL

Frederick C. Frank, South Bend, Ind., assignor to Bendix Products Corporation, South Bend, Ind., a corporation of Indiana Application November 19, 1934, Serial No. 753,592

4 Claims. (Cl. 301—63)

This invention relates to wheels, and more particularly to wheels for use in connection with very large or heavy aircraft.

The wheels of heavy aircraft are frequently subjected to excessive overloads when the aircraft on which they are used contacts the ground, especially if a heavy or rough landing is made. It is therefore necessary that the wheels incorporate a high factor of safety to assure that the wheels will not be broken or distorted under various operating conditions.

It is frequently necessary to avoid injury to aircraft that they be stopped as quickly as possible after contacting the ground. It has been found that with a single braking element it is impossible to apply sufficient force to the wheel to stop the aircraft as quickly as desired. The heat generated during the application of the brakes, when the kinetic energy of the aircraft is turned into heat, is so great that it is impossible to adequately dissipate it when a single braking element is employed.

An object of this invention is to provide a very strong aircraft wheel for use with the largest type of aircraft.

A further object is to provide in combination with such an aircraft wheel an airplane brake having sufficient braking area to quickly bring the aircraft to a stop.

Another object is to provide an airplane wheel having a plurality of separate braking elements operable to dissipate the generated heat more rapidly and to thereby increase the efficiency of the brakes.

A still further object is to provide an improved aircraft wheel having brake applying means disposed on opposite sides of the wheel.

Yet another object is to provide an improved airplane wheel which may be cast in two sections to facilitate the forming of the wheel, and provided with novel means for fixing the two sections of the wheel together.

A still further object is to provide a cast wheel of U section with lateral rectangular webs, the hub of which is interrupted between end discs for lightness and to facilitate casting and afford access to all spaces inside the casting.

Other objects and advantages of this invention will be apparent from the following detailed description, together with the accompanying drawings, submitted for purposes of illustration only and not intended to define the scope of the invention, reference being had for that purpose to the subjoined claims.

In the drawings, wherein similar reference characters refer to similar parts in both views.

Figure 1:
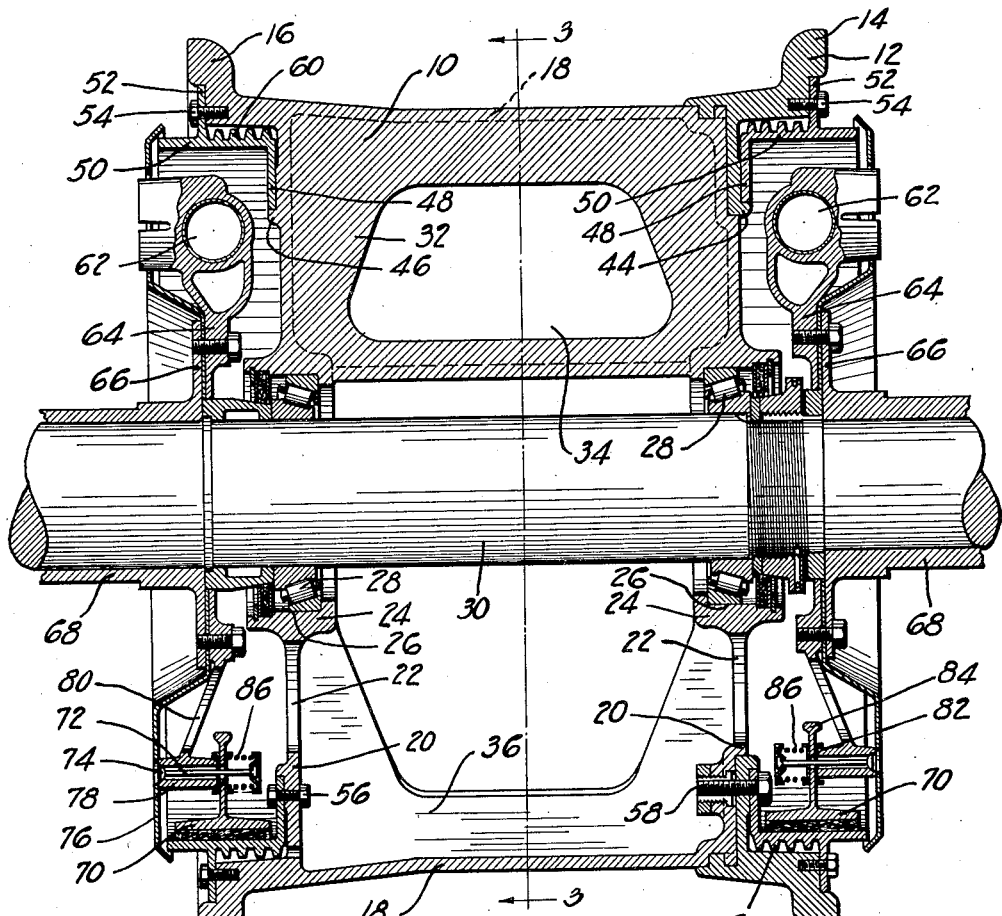
Figure 1 is a vertical section through a wheel embodying the invention.
Figure 2:
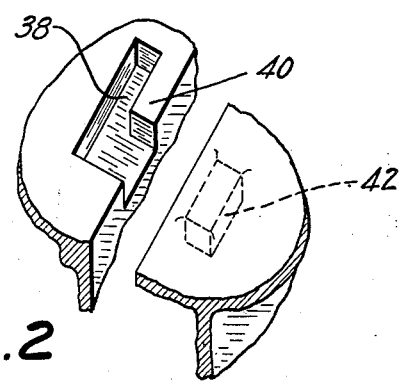
Figure 2 is a perspective view of the joint shown in Figure 1.

Referring to the drawings, and more particularly to Figure 1, there is shown a wheel formed in two cast sections 10 and 12. The section 10 forms the main body of the wheel. The section 12 is provided with a flanged member 14 to cooperate with the section 10 to hold one side of the tire (not shown) in place on the wheel. The section 12 is formed separately from the section 10 to facilitate casting of the section 10. The two sections are formed with cooperating locking grooves and interrupted segments, whereby the section 12 may be placed upon the section 10 and locked in place by turning one section relative to the other.

The section 10 is provided with a flanged member 16, similar to the member 14 carried by the section 12 of the wheel, to hold the other side of the tire (not shown) on the wheel. Between the flanged members 14 and 16 the section 10 is provided with an annular tire engaging rim 18. The side walls of the section 10 are formed of radially extending discs 20 having cut-out sections 22 to decrease the weight of the wheel. The discs 20 are provided with hub sections 24. The inside of each section 24 is recessed from the outside as at 26 to form a seat to receive inclined roller bearings 28 through which force is transmitted from the axle 30 to the wheel.

Figure 3:
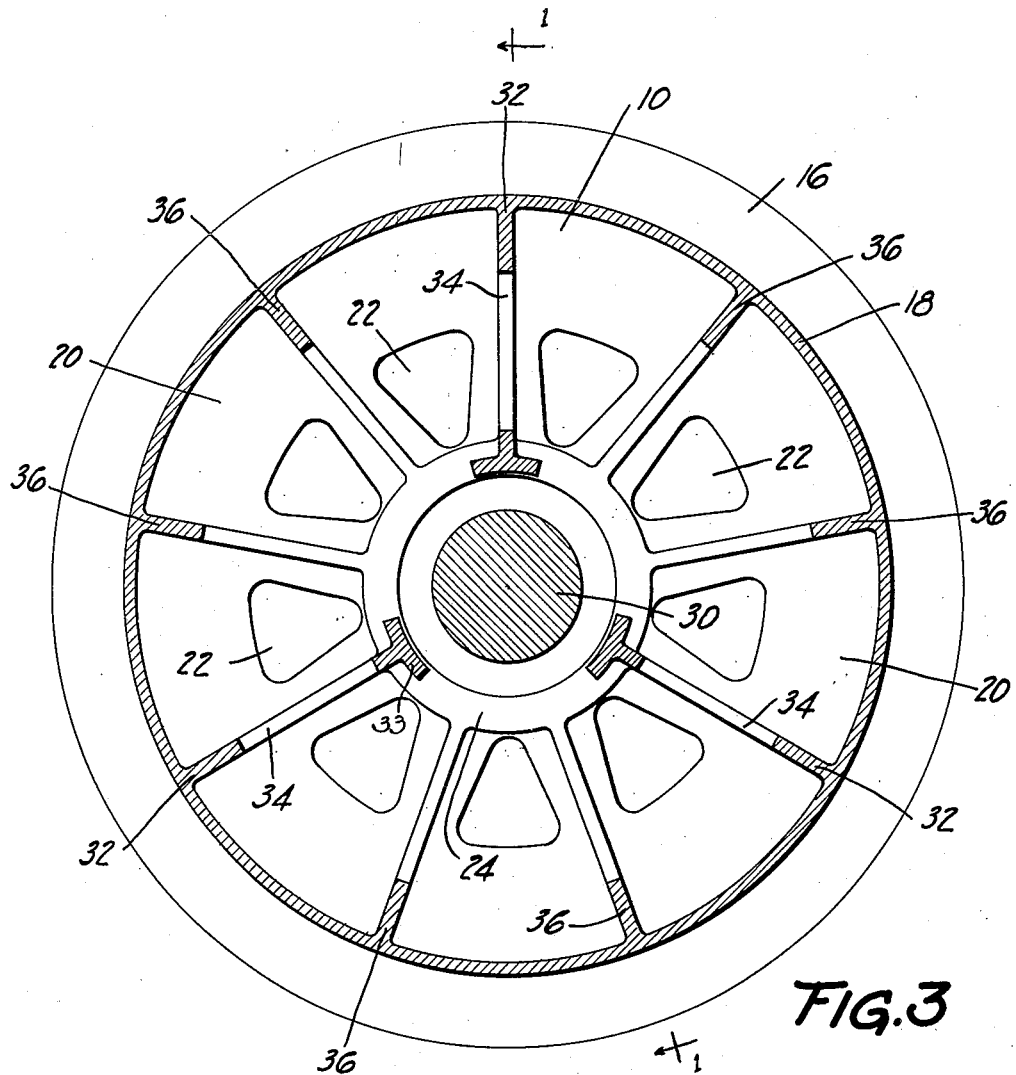
Figure 3 is a section taken substantially on the line 3—3 of Figure 1.

The section 10 is provided with a plurality of, preferably three, spaced reinforcing webs 32 having cut-out sections 34 to decrease the weight of the structure. These reinforcing webs 32 connect the hubs 24 of the wheel, and have axially extending arcuate flanges 33 as more clearly shown in Fig. 3.

The section 10 is further provided with a plurality of, preferably six, spaced rigidifying flanges 36 extending from the hubs 24 toward the annular rim 18, as indicated in the drawings. It is preferred, when six rigidifying flanges 36 are employed and three reinforcing webs 32, that the reinforcing webs 32 be positioned 120° from each other and that two reinforcing flanges 36 be positioned between each pair of reinforcing webs 32.

The rim 18 is provided with annular grooves 38 a short distance from the end of the rim so that interrupted annular projections or tongues 40 are left upstanding on the end of the section 10. The section 12 of the wheel is provided with cooperating lugs 42 adapted to slide through the annular grooves 38 and be engaged by the tongues 40 when the section 12 is rotated with respect to the section 10.

The section 12 is provided with an abutment or support 44 corresponding to a similar abutment or support 46 carried by the radial disc 20 of the section 10 of the wheel. The supports 44 and 46 receive the ends of annular supports 48 of brake drums 50. Each brake drum 50 is further supported by an annular flange 52 secured to the edges of the sections 10 and 12 of the wheel by bolts 54.

When the sections 10 and 12 have been placed in juxtaposition, rotated to fix them together, and the brake drums 50 placed in position, the parts are locked in fixed relation by the bolts 56 and 58.

It will be observed that the brake drums 50 are provided with cooling fins 60 between the flanges 52 and the discs 20 to assist in the dissipation of the heat generated when the brakes are applied.

Means are provided for applying the brakes. The illustrative embodiment discloses hydraulic means including a fluid wheel cylinder 62 carried by a support 64 fixed to a flange 66 on a sleeve 68 secured to the axle 30. When the actuating mechanism (not shown in full) is applied to set the brakes, the shoes 70 are urged into contact with the brake drums 50 to resist rotation of the wheel relative to the axle 30.

A steady rest is provided to hold the shoes 70 in the proper operating position with respect to the brake drums 50. A stem 72 having a spherical head 74 is mounted in a cover plate 76, so as to permit universal movement of the stem 72. The stem 72 passes through a guide member 78 fixed to the flange 66 by an arm 80. The stem passes through an aperture 82 in the web 84 of the brake shoe 70, and the web 84 is yieldingly urged into abutment with the guide member 78 by a spring 86. The brake shoe 70 is thus yieldingly held in the proper position to contact the brake drum 50 uniformly over the entire area of the shoe 70 when urged into contact therewith, thereby assuring uniform operation of the brakes.

The invention thus comprehends the provision of a very strong reinforced airplane wheel having a plurality of independent braking elements disposed on opposite sides of the wheel for use with the largest type of aircraft.

While the invention has been particularly described with reference to a preferred illustrative embodiment, it is not intended to limit the scope of the invention to the embodiment described, nor otherwise than by the terms of the following claims.

I claim:

1. In an airplane wheel, a cast body section having an elongated annular rim and an end disc, a cast auxiliary section including a tire engaging flange, an annular auxiliary section support on said disc, an annular brake drum support on said auxiliary section, cooperating means carried by the body and auxiliary sections to fix said sections together, and means to lock said sections together.

2. An integral cast airplane wheel having a cylindrical rim and spaced end disc members, each disc member being provided with a short hub flange independent of the other, and a plurality of uniformly spaced radial and axial extending rectangular webs extending from said disc members and said rim member, said webs forming the sole direct connection between the hub flange on one disc member and the hub flange on the other disc member.

3. An integral cast airplane wheel having a cylindrical rim and end disc members each having individual hub portions, a radial longitudinal section of which is U shaped, and a plurality of uniformly spaced radial and axially-extending thin rectangular webs integrally connecting said rim and end discs, said webs forming a sole means for rigidly fixing the spacing between the hub portion of one disc and the hub portion of the other disc.

4. An integral cast airplane wheel having a radial longitudinal section of U shape forming a rim and side walls, and uniformly spaced radial and longitudinal extending rectangular web members integrally connected to the inside walls of the wheel said wheel having spaced apart hub portions connected solely by said web members.

FREDERICK C. FRANK.